Patented June 6, 1950

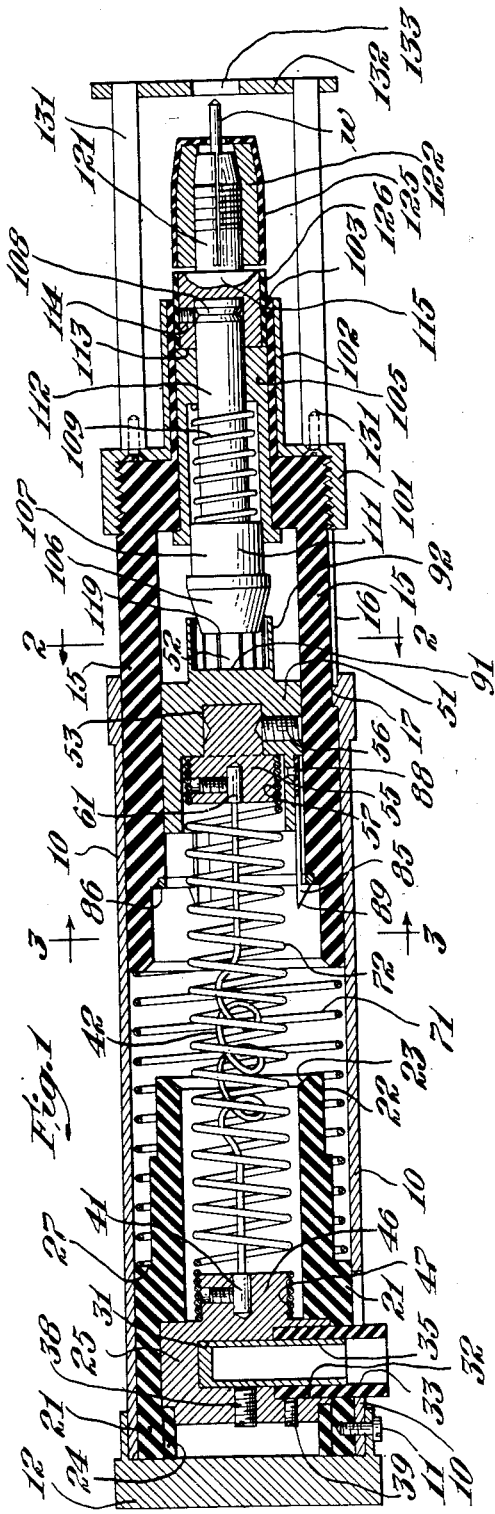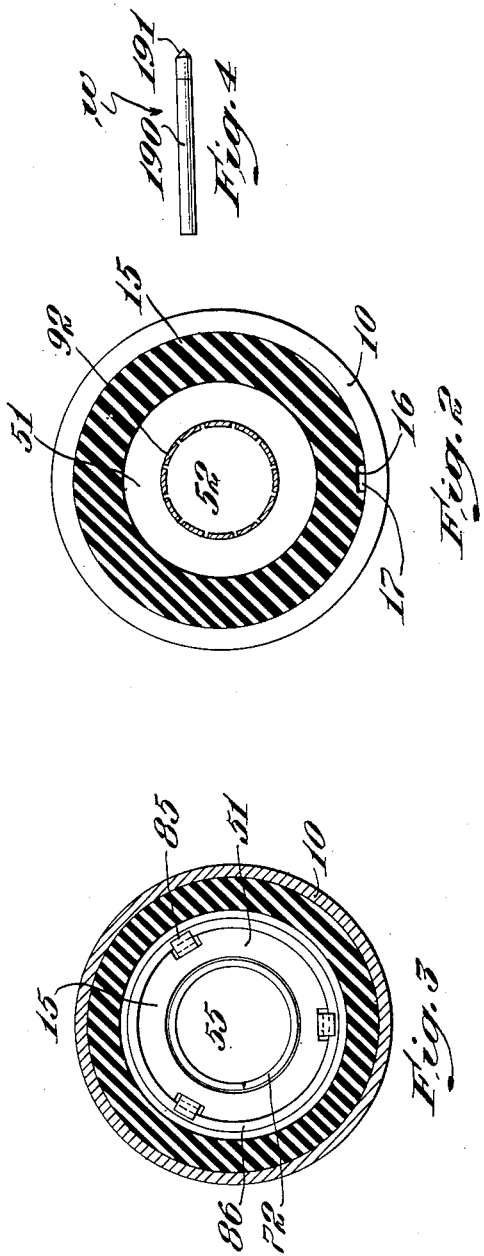

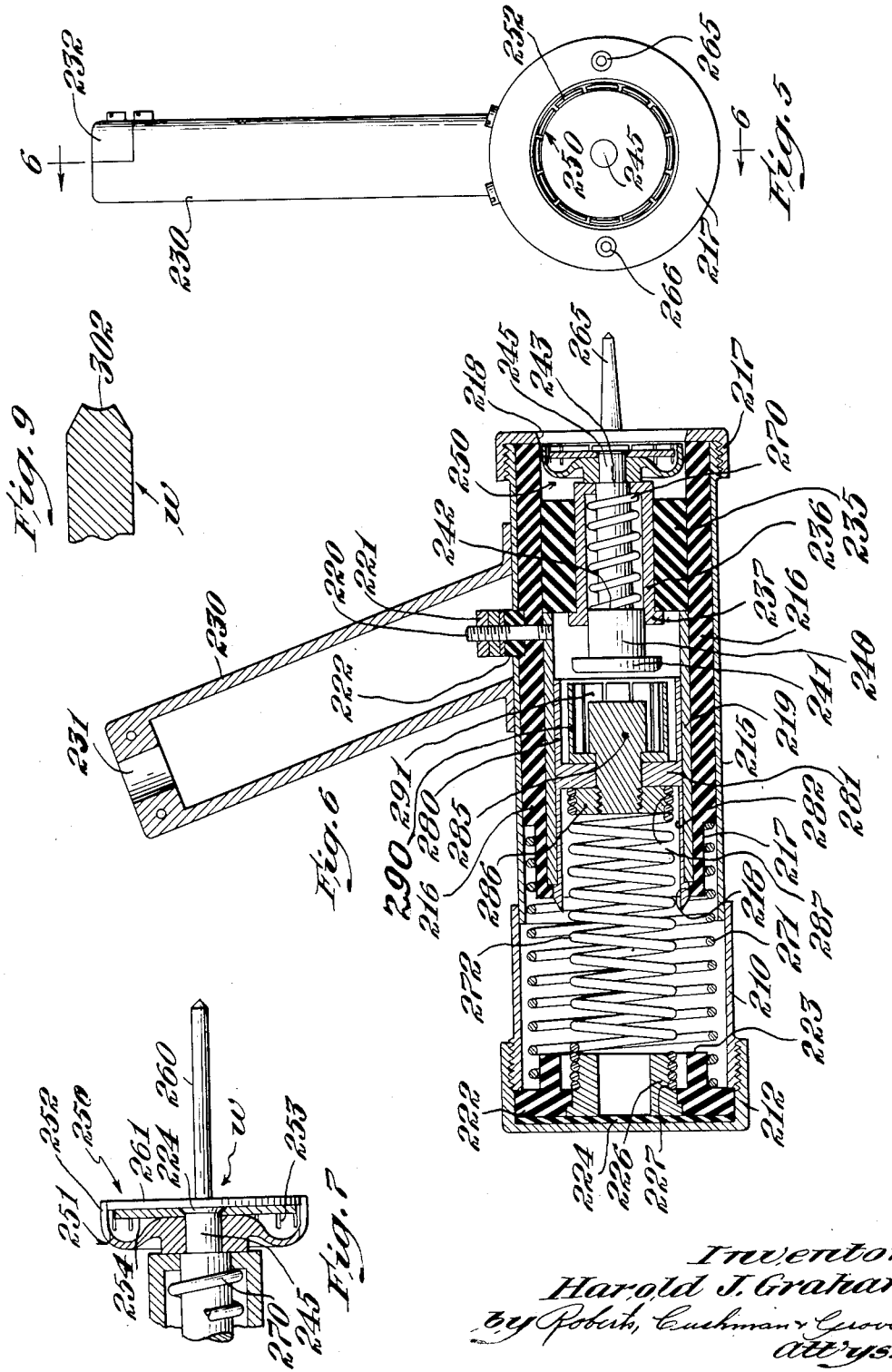

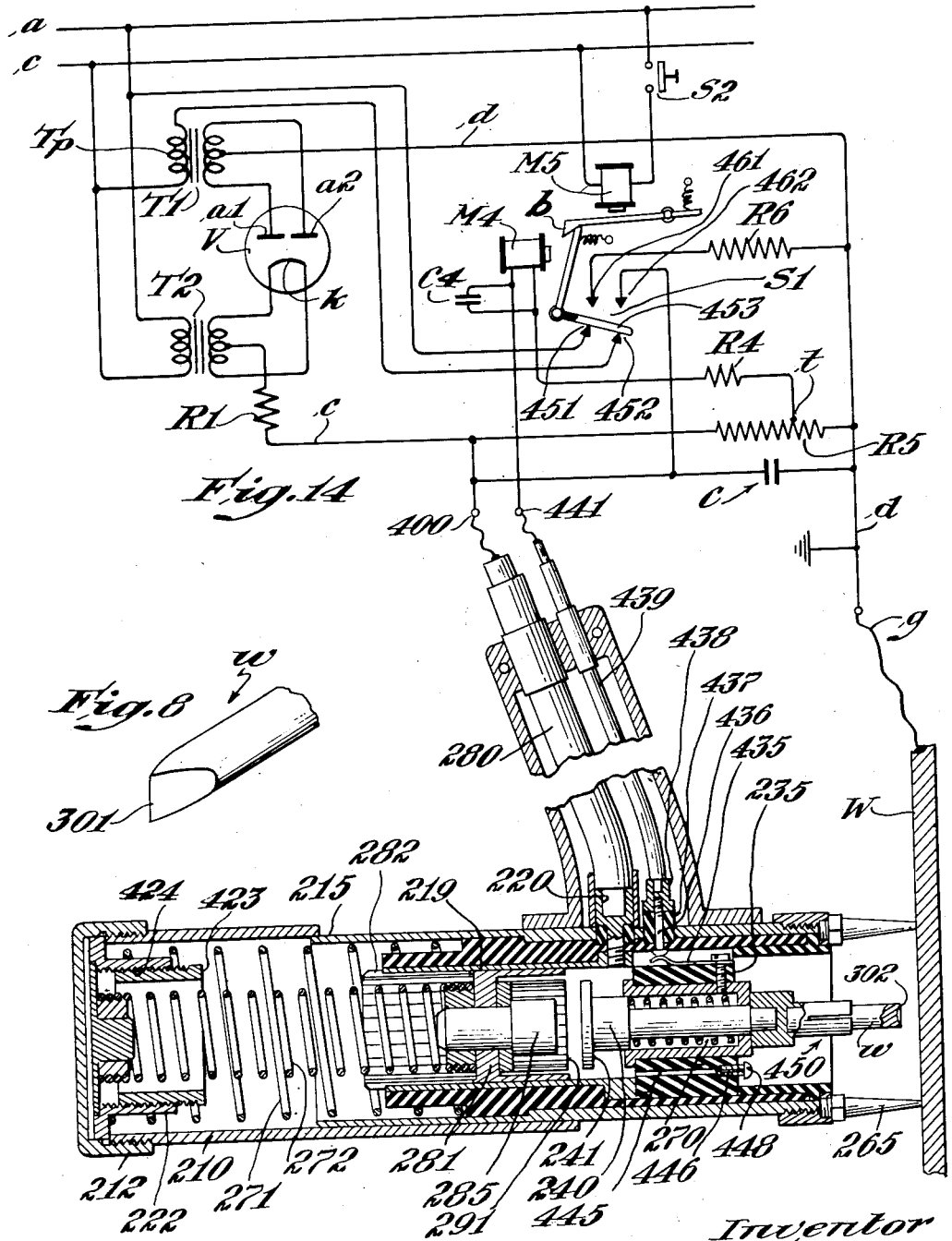

2,510,101

UNITED STATES PATENT OFFICE 2,510,101

ELECTRIC PERCUSSION WELDING SYSTEM

Harold J. Graham, Boston, Mass., assignor, by mesne assignments, to Graham Manufacturing Corporation, Detroit, Mich., a corporation of Michigan Application September 28, 1946, Serial No. 700,136

17 Claims. (Cl. 219—4)

This invention relates to an electric welding and piercing system of the type wherein a mechanical impact tending to unite two construction elements is applied together with a current impulse.

One of the principal objects of the invention is to provide equipment of the above mentioned type whose impact applying component is normally disconnected from the source of electric welding energy and which depends for establishing an operative electric connection not upon the blow impact between its percussion elements, but separates the circuit preparing switching function from the blow or percussion function.

Other objects are to provide in equipment of this type for positive correlation of a loose work piece and a stationary work piece or tool element without direct contact; to provide a tool which is suited not only for welding but also for piercing; to provide a tool which is especially suited for welding studs to a stationary work piece; to provide a tool which is particularly suited for welding studs to flat surfaces, and to provide studs shaped to promote such welding; to provide such a tool which is for its current supply independent of internal contact making devices; to provide a percussion welding tool that can be easily adapted for operation with a welding circuit closed by a contact maker within the tool, or by a contact maker separated therefrom and associated with an automatic control circuit; to provide a welding system including a percussion welding tool and a circuit particularly suited, according to the invention, for operation with tools of that type; to provide welding equipment which incorporates a tool with normally restrained impact means imparting a blow to initially separated pieces to be joined with the welding current flowing therethrough immediately upon contact of the pieces, and which automatically prohibits operation if the pieces should initially come into accidental contact; to provide a welding tool of this type which permits regulation of the time relation between blow and closing of the welding circuit; and generally to provide percussion welding and piercing equipment which is simple, safe, inexpensive, easily serviceable, and yet reliable and adaptable fully to comply with the requirements of a wide variety of applications.

In one aspect, the tool according to the invention accomplishes these objects by means of two relatively sliding members which are connected by an energy supplying element as for example a spring, and one of which carries a hammer or plunger which is normally attached to its slide but released therefrom upon movement of the slides towards each other, the hammer carrying slide also carrying a force transmitting and contact making sliding element, so that the hammer or plunger, when released from its slide, first makes contact with and then applies a percussion blow to the transmitting element.

In another aspect, one of the slide members is provided with a distancer which permits application of the tool by supporting it against one of the work pieces to be joined, such as a stationary piece, while releasing the percussion and contact making elements and performing the welding or piercing operation by pressing the other slide member towards the fixed work piece; in still another aspect, the invention provides for a piercing operation, by using in the above characterized welder, supplied from a suitable circuit according to the invention, a tool which has a tip of non-welding material for example tungsten and which, instead of being joined to a work piece, maintains an arc and penetrates that work piece, whereupon the piercing tool can be withdrawn, the arc having been extinguished through collapse of the charge of a capacitor in the supply circuit, or opening of the circuit by switch means provided for that purpose; in a further aspect, the invention permits current supply directly to the tool holder by leading a conductor laterally through one of the slides; and in still another aspect, the new welder promotes proper circuit making and breaking by means of contact timing arrangements especially suitable for present purposes. Additional aspects of the invention are welding installations as a whole including tools according to the invention in combination with safety switch means that normally disconnect the tool from its supply circuit which may contain energy storing means such as capacitor means and connect it at the will of the operator whereupon the tool is ready for the automatic closing of contacts in series with the safety switch; installations with tools according to the invention which have the above mentioned contact maker separate from the tool, in combination with a circuit which automatically prepares the welding circuit by means of a voltage responsive element when the required energy is available, closes it for the welding operation proper through the work pieces, and automatically opens the welding circuit by way of a switch element responsive to the welding current surge; and an installation which precludes welding and protects equipment and operator if the pieces to be joined should make contact prior to the desired percussion impact.

Further features of the invention are a chuck particularly suited for welding disk studs to a fixed work piece; studs of peculiar shape particularly adapted for work with the welding tool and welding equipment as a whole according to the invention; adjustable triggering means for releasing the hammer portion of the tool; and pneumatic means of the nature of a dash pot for adjusting the impact force dealt by the hammer element of the percussion welding tool according to the present invention.

These and other objects, aspects and features will appear from the following description of two typical practical embodiments illustrating the novel characteristics of my invention. This description refers to drawings in which Fig. 1 is a longitudinal section through a welding tool according to the invention;

Fig. 2 is a section on lines 2—2 of Fig. 1;

Fig. 3 is a section on lines 3—3 of Fig. 1;

Fig. 4 is an elevation of a piercing tool which can be used with the equipment according to Figs. 1 to 3;

Fig. 5 is a front elevation of a second embodiment of the invention;

Fig. 6 is a section on lines 6—6 of Fig. 5;

Fig. 7 is an elevation of a stud inserted in its chuck which is shown in section, which stud is particularly suited for use with the tool according to Figs. 5 and 6;

Fig. 8 is an isometric view of a wedge shaped stud tip suitable for use with welding tools according to the invention;

Fig. 9 is a longitudinal section of a cupped stud tip;

Fig. 14 is a diagram of welding equipment incorporating a tool of the type of Fig. 6 with some modifications, this tool being shown in a longitudinal section similar to Fig. 6.

Figure 10:
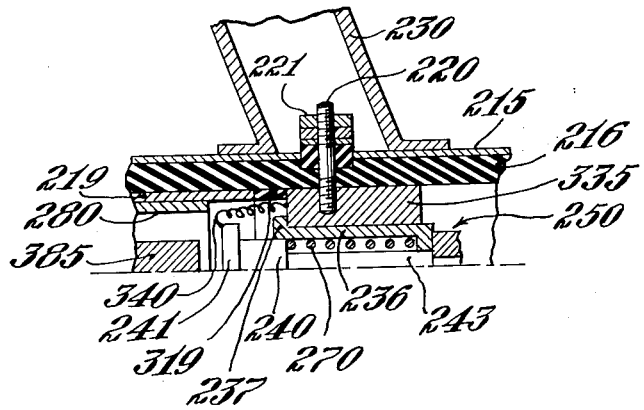
Fig. 10 is a fragmentary section derived from Fig. 6, of a modified hammer portion without circuit closer.

In Figs. 1, 2 and 3, numeral 10 designates an outer guard and guide casing or housing preferably made from metal and carrying, for example screwed thereto at 11, a handle 12 which may have any shape which is convenient for holding the tool against a work piece in the manner to be described hereinbelow.

A plunger casing 15, made from insulating material and having a groove 16 is slidingly fitted into the guide casing 10; a key 17 of casing 10 fits groove 16, securing housings 10 and 15 against other than straight line movement.

Also secured to the housing 10, in the present instance for example by means of the above mentioned screw 11, is a releasing block 21 of insulating material, for instance Bakelite tubing. The block 21 has an extension 22 with an inside latch relieving bevel rim 23. Held between the releasing block 21 and a spacer tube 24, likewise of insulating material, is a terminal block 25 made of metal and having a bore of two diameters, as indicated at 31 and 32. The outer, larger bore 32 contains an insulating tube 33 whose inner diameter is that of the inner bore 31. End bore 31 and tube 33 hold a metallic terminal cup 35, which has the purpose of receiving a conductor (not shown in the drawing) secured thereto by means of a contact set screw 38. The tube 33 is held in block 25 by means of a set screw 39.

The terminal block 25 also has a central hole 41 for one end of a tail wire conductor 42 held therein by means of an appropriate set screw. The reduced head 46 of block 25 is provided with a thread 47 for holding the spring to be described hereinbelow.

Within the plunger casing 15 slides a plunger 51 with an impact and switch portion 52, and a core portion 53. A terminal block 55 fits the core portion 53 wherein it is held by means of set screws 56. The outer, larger portion of terminal block 55 is provided with a thread 57, which is similar to, and has the same purpose as thread 47 of head 46 of block 25. Block 55 is further provided with a terminal bore 61 and a conductor holding screw similar to the corresponding elements of block 25.

A resetting spring 71 is inserted between the inside of casing 10 and the outside of the tubular front portion 22 of block 21, and between the shoulder 27 of block 21 and the end face of plunger casing 15. This spring is slightly compressed when the tool is in inoperative position as shown in Fig. 1.

An impact spring 72 is fastened to blocks 25 and 55 through engagement by threads 47 and 57; this spring is substantially untensioned in normal condition of the tool, but becomes tensioned during the operation and then becomes again slack.

The plunger 51 is related to plunger casing 15 by means of a latch device which consists of a number, for example three spring latches 85 (see also Fig. 3) which normally engage an inset 86 of casing 15. The latch springs 85 are fastened to the plunger 51 by suitable means, for example rivets 88 (Fig. 1). The inclined cam faces 89 of springs 85 are so arranged that they are engaged by bevels 23 of tube extension 22, when the guide housing 10 is pressed forward, so that upon contact with bevel 23, the springs 85 are moved inwardly, relieving plunger 51 from its casing 15 and constituting a timer which controls the interval between the electrical contact at 92 and the mechanical impact at 119.

The above mentioned impact and switch portion 52 of plunger 51 has a face 91 surrounded by switch springs 92 which may be formed by applying saw cuts to a tubular projection of plunger 51, as clearly indicated in Fig. 2.

Member 107 has a conical contact portion 106 which corresponds to contact springs 52. These two parts are so dimensioned and arranged that under normal conditions they are wholly separated, whereas upon plunger 51 being released by retraction of latches 85, springs 52 engage cone 106 before the face 119 of hammer 111 engages face 91 of plunger 51.

A flexible conductor 42 is connected, within springs 72 to the above mentioned contact devices 41 and 61.

The forward end of plunger casing 15 carries screwed thereto, a cap 101 which is extended into a chuck tube 102. The plunger casing 15 itself ends in a chuck casing portion 103 inside of chuck tube 102 and insulating the latter from a hammer sleeve 105 which carries a contact and hammer member 111 with a contact and impact head 106, a guide portion 107, and a shank 112 which has retaining neck 108. This shank portion is secured to chuck block 115 by means of screws 114 permitting rotary movement between these parts. A spring 109 tends to contact the chuck 115 with face 113 of sleeve member 105.

Base 115 is extended into a split chuck portion 121 which is threaded for a chuck sleeve 122, this arrangement permitting engagement, in the customary manner, of a work piece w.

The chuck base as well as the chuck sleeve are provided with insulating covers 125, 126 which, together with the above mentioned tubular extension 103 of plunger casing 15, fully insulate the hammer and chuck portions from cap 101 and the distancing piece fastened thereto as now to be described.

The cap 101 carries two or more distancer columns 131, to which is fastened a distancer ring 132 which has a central opening 133 permitting penetration therethrough of the work piece w.

The above described tool is used and operates in the following manner.

A work piece w, for example a pointed or edged stud, is inserted in the chuck 121 by tightening sleeve 122. The tool is then held against the work piece to which the stud w is to be joined by welding, with plate 132 resting against the flat work piece, with opening 133 marking the point to which w is to be joined. It is assumed that terminal 35 is connected to an appropriate source of current such as will be described hereinbelow and that the work piece to which w is to be joined (which will be referred to as the large piece) is grounded or otherwise included in the welding circuit.

With distancer 131, 132 held against the large work piece, pressure is now applied to end cap or handle 12, thus compressing springs 71 and 72 and causing tube 10 to slide forward on the stationary plunger casing 15. When bevel 23 reaches latch faces 89, the latches are moved inwardly and release plunger 51 from casing 15. Spring 72 thereupon drives plunger 51 rapidly towards hammer 111, establishing electrical contact at cone 106 and spring members 92, and shortly afterwards contacting the face 119 of hammer 111. The hammer 111 is now advanced, against the force of spring 109 until the stud w is forcibly driven into contact with the large work piece. The hammer and hence the chuck 121 and the stud w being connected in the welding circuit through contacts 92—106, the tip of work piece w strikes an arc while being forcibly contacted with the other work piece; a very strong joint is thus formed, due to the simultaneous application of welding current and percussion.

Figure 11:
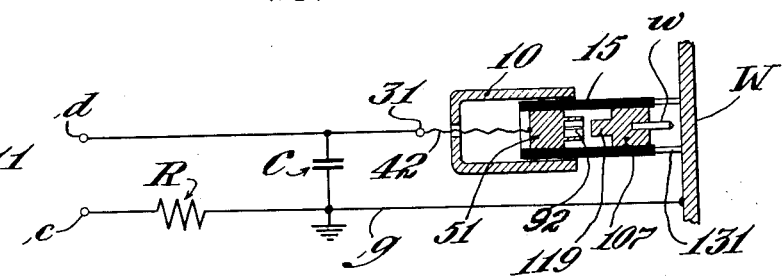
Figs. 11 and 12 are diagrams of welding equipment incorporating tools according to Figs. 1 to 7.

It will be understood that the welding current path must be continuous which, as above mentioned, can be accomplished by grounding the large work piece W to which the stud w is to be welded, and by also grounding one side of the source of welding current, the other pole of which is connected to block 25 and through the tail wire 42 to plunger 51, hammer 112, chuck 121, and work piece w as shown in Fig. 11 which will be explained in detail below.

When the operator releases his pressure on handle 12, spring 71 separates tubes 10 and 15 while returning into normal condition, and block 51 is quickly retracted by spring 72 which became compressed prior to the impact. Spring 72 pulls the plunger 55 with it until latches 85 engage the lining 86 of plunger casing 15. The chuck can now be opened and the tool withdrawn from the work piece w, whereupon the hammer 111 is returned into normal position by spring 109. The tool is now ready for insertion of another stud w and the next welding operation.

The above described tool is also very well suited for piercing of work pieces, especially sheets, in the following manner:

Instead of inserting a welding stud w into the chuck, a piercing rod such as shown in Fig. 4 is used, which consists preferably of a steel shank 190, if desirable but not necessarily tipped with non-welding material, such as tungsten, as indicated at 191.

It was found in actual practice, that the arc formed between the tungsten tip and the large work piece against which distancer 132 rests do not weld together if the accompanying conditions, particularly the speed of the blow are properly selected, but that the arc remains effective until the material has melted through the entire thickness of the work piece, whereupon the piercing rod is withdrawn.

Another embodiment of the invention will now be described with reference to Figs. 5, 6 and 7.

In Figs. 5 and 6, 212 is a cap which is screwed to a metal tube 210 constituting a housing which holds against the cap 212 a block 222 and a disk 224 of insulating material which in turn hold a metal tube 226 having a spring thread 227. Within tube 210 slides another metallic tube or plunger casing 215, which is lined with a tube 216 of insulating material which has at its lower end a recessed portion 217. This narrower portion has an inner rim 218 against which rests a metallic tube 219 which is fastened to tubes 216 and 215 by means of a bolt 220 with appropriate nuts 221 and an insulating washer 222, which bolt rigidly connects the tubes 215, 216 and 219, and also serves as an electrical conductor connecting tube 219 with a flexible wire introduced through a protective housing 230 attached to plunger casing 215 and having a grummet opening 231 with cover 232 (Fig. 5).

Pressed into tube 216 and abutting against metal tube 219 is a hammer carrying tube 235 of insulating material which holds a metal sleeve 236 with a flange 237. Within sleeve 236 is slidingly inserted a percussion block 240 having a contact and impact head 241, a shoulder portion 242 and a chuck shoulder portion 243. For example by means of a sunk rivet 244 the chuck shank 245 holds a chuck 250 against shoulder 243. The chuck, also shown in Fig. 7, consists of a cup disk 251 which has an annular rim 252 provided with saw cuts 253, and a plate 254. This chuck is especially appropriate for holding a disk stud of the type shown in Fig. 7, which consists of a stud portion proper 260 fastened to a disk portion 261. This disk portion is held in the chuck simply by inserting it into ring portion 252, slightly expanding the yielding saw cut portions which thereupon hold disk 261 pressed against the chuck plate 254.

The tube 216 is confined within plunger housing tube 215 by means of a cap 217 which has an opening 218 and may be provided with spacers 265. A spring 270 retains the chuck within the tube 216 by pressing chuck base 251 against sleeve 236, as shown in Fig. 6, above mentioned opening 218 in cap 217 being large enough to permit exit of the chuck from within tube 216.

Within metal tube 219 slides a plunger 280 which has a core portion 281, and several latch springs 282, which in normal position lock the plunger against the inwardly protruding edge of metal tube 219. Held against the core 281 is a hammer piece 285, by means of a nut 286 which is on the outside provided with a spring thread 287. By means of the corresponding thread 227, a spring 272 is fastened between plunger 280—285 and metal tube 226. Another spring 271 is inserted between blocks 222 and 216, normally slightly tending to move tubes 219 and 215 apart, against the tension of spring 272, thus retaining these housing members in the relative position shown in Fig. 6.

Hammer portion 285 holds, against core 281, a contact spring cup 290 which has a tubular portion separated into spring elements 291 by means of saw cuts, as indicated in Fig. 6. Contact head 241 of block 240 is dimensioned to fit within the springs 291, for making electrical contact therewith.

This welding tool operates as follows:

Contact stud 220 and therefore tubes 219 and 280 are connected to an appropriate current supply source, the stationary work piece is connected, and a disk stud is inserted in chuck 250. Spacers 265 are then pressed against the large stationary or otherwise fixed work piece to which stud 260 is to be welded. The spacers 265 are somewhat longer than the stud so that the latter is slightly distanced from the work piece. Pressure is then applied against cap 212 which may be provided with a handle, until the inner edge of block 222 forces latch springs 282 inwardly, thereby releasing slide 219 which is then forcibly moved towards block 240. Head 241 first makes contact with springs 291, and shortly afterwards hammer 285 impacts head 241, forcing the stud 260 towards the piece to which it is to be welded with the chuck emerging slightly from cap 217, against the pressure of spring 270.

The welding takes place as above described, and upon release of pressure against cap 212, the springs withdraw plunger 280—281 until latches 282 again engage sleeve 219. Spring 270 thereupon withdraws hammer member 240, disengaging the chuck rim 251 from the stud disk 261. The welding tool is thereupon ready for insertion of another stud and the next welding operation.

It will be noted that the embodiment according to Figs. 5 and 6 avoids the necessity of having a flexible conductor between the connecting contact and the percussion elements of the tool, continuous contact being in this instance provided through sleeves 219 and 280.

Tools of this type can be used in the above mentioned supply circuits which will be described more in detail below, a tool according to Figs. 5 and 6 being shown in circuit diagram Fig. 12.

It is understood that any convenient work holding device, chuck, or other similar appliance can be used with welding tools according to the present invention. Also, the spacers can be modified to suit any purpose at hand, and made exchangeable in accordance with the studs to be used.

I found that for many purposes, particularly also for welding aluminum work pieces, pointed or edged tips are preferable to blunt tips. Simple points such as shown in Figs. 1 and 7 are often sufficient, but particularly satisfactory results are obtained when the contact area is enlarged such as by extending the essentially point shaped tip according to Figs. 1 and 7 into a linear edge as shown at 301 of Fig. 8, or by extending it still further in the shape of a cupped tip with circular edge as shown at 302 of Fig. 9. The larger contact area of tips according to Fig. 8 and particularly Fig. 9 reduces the current density at the weld which is sometimes advantageous since certain metal sheets, for example of copper, tend to burn through instead of welding if the contact area is too small.

It is sometimes desirable under given working conditions to avoid electric contacts within the welding tool. In order to avoid such contacts, the present invention permits modification of Fig. 6 as shown in Fig. 10, this modification being suited for use in circuits of the type shown in Fig. 13.

Fig. 10 is similar to Fig. 6, with the following exceptions. The contacts 291 surrounding member 285 of Fig. 6 are omitted, the tool according to Fig. 10 having an impact member 385 which rests directly on slide member 280. The insulating sleeve 235 of Fig. 6 is replaced by a conducting sleeve 335 into which is screwed terminal stud 220, and which is separated from metal sleeve 219 by an insulating tube 319. It will be evident that welding current reaches the hammer member 243 directly through stud 220, sleeve 335, and spring casing 236 within which plunger 243 slides. Although this precaution is in most instances unnecessary, a flexible conductor 340 may be provided between sleeve 335 and plunger face 241, as indicated in Fig. 10.

The mechanical operation of the tool according to Fig. 10 is exactly as described above with reference to Figs. 5 and 6. The electric operation will be described below with reference to Fig. 13.

Circuits for use in systems incorporating tools of the above described type will now be described with reference to Figs. 11, 12 and 13.

Fig. 11 shows at $d$, $c$ a current supply system which feeds into the welding network with limiting resistor R and energy storing element C, which may be a conventional capacitor, an electrolytic cell, or any device able to accumulate energy for sudden discharge through the welding tool. Thus, the current supply with resistor and capacitor may be replaced by a storage battery of suitable energy content, or by a constant potential generator. One terminal of the capacitor C is connected to one work piece, in the present instance it is connected through ground $g$ to sheet W. The other capacitor terminal is connected to tool terminal 31 and flexible conductor 42 as indicated in Fig. 1 as well as Fig. 11.

Capacitor C discharges through the circuit finally closed through work pieces $w$—W, after this circuit has been prepared through closure at 92 and 107, shortly prior to the percussion impact at 91 and 119.

Figure 12:
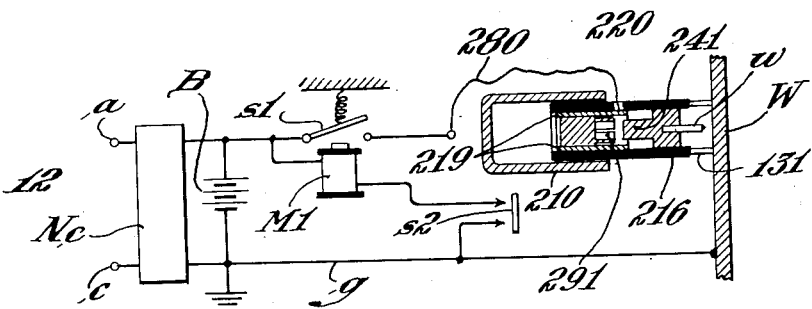

The circuit according to Fig. 12 includes a tool according to Fig. 6 and has, in series with the internal welding switch 291—241, a safety switch $s1$, operated by a solenoid M1 which is energized through a pushbutton or similar switch $s2$ preferably arranged on the welding tool or at the end of a flexible double conductor which at its end carries the switch ready for actuation by the welding tool operator. One contact of switch $s2$ is connected to ground, supply circuit, and stationary welding piece W, whereas the other contact of switch $s2$ is connected, through solenoid M1, to the other terminal of the source. This source is in the present instance indicated as a battery B, which may be connected to an alternating current supply circuit, $a$, $c$ through a rectifying and battery charging network Nc. One terminal of solenoid operated switch $s1$ is connected to the last mentioned source terminal, and the other contact of s1 is connected through flexible wire 280 to terminal stud 220 of the tool according to Fig. 6, which terminal is conductively connected to sleeve 219, as indicated also in Fig. 12. It will be understood that the flexible conductor 239 leads through opening 231 of handle 230, shown in Fig. 6.

The equipment according to Fig. 12 operates as follows:

Switch s2 is normally open and only closed when the welding tool is in place with stud w distanced from sheet W and internal switch 241—291 open, that is before handle 210 is pressed towards stationary work piece W. When the operator is ready to exert pressure upon 210, he closes switch s2, energizing solenoid M1 and closing switch s1 which prepares the welding circuit. Pressure on 210 thereupon releases member 285 (Fig. 6) and closes switch 241—291 with ensuing percussion welding as described above. After the weld is completed, switch s2 is again released which causes opening of switch s1 after the welding circuit has been broken at 241—291. The circuit is now again ready for operation. This arrangement avoids accidents, keeping the welding tool separated from the live supply terminal until it is ready for operation.

Figure 13:
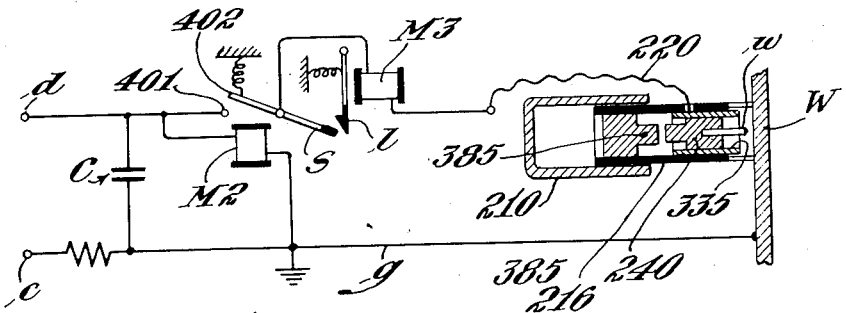
Fig. 13 is a diagram of welding equipment incorporating a tool according to Fig. 10.

The equipment shown in Fig. 13 incorporates a welding tool without internal contact, as described above with reference to Fig. 10.

The internal contact maker is in this instance replaced by an external switch S, associated with and operated by solenoids M2 and M3 as follows. Contacts 401, 402 of switch S are normally open, but closed when voltage solenoid M2 is energized, whereupon contact 402 is retained in closed position by latch l, provided that solenoid M3 is de-energized, with w and W separated. Energization of solenoid M3 retracts latch l, releasing contact 402 and opening switch S. Contact 402 is connected, through solenoid M3, to terminal stud 220 of the welding tool according to Fig. 10. Solenoid M2 is connected between the two capacitor terminals, one of which is grounded and connected to the stationary welding piece, at g.

The arrangement according to Fig. 13 operates as follows:

When condenser C has attained its proper charge, determined for the purpose at hand, solenoid M2 closes switch S which is thereupon locked by latch l. The welding circuit is now fully prepared and the weld is made when stud w touches work piece W after hammer 385 is released from its holding latches 282 (Fig. 6). The welding current surge energizes solenoid M3 which attracts latch l, permitting switch S to open. The capacitor C thereupon charges again and, upon the proper charge of C having been reached, the tool is again ready for operation.

Since the proper functioning of welding equipment according to the present invention depends upon initial separation of the two work pieces, it is important to make sure that this separation is actually present and to prevent initiation of the welding operation proper if the work piece which is to receive the percussion blow should accidentally contact the other work piece before that blow is rendered, simultaneously with supplying electric welding energy. The equipment now to be described with reference to Fig. 14 is suitable for that purpose.

The tool shown in Fig. 14 is in its principal elements quite similar to the embodiment described with reference to Figs. 5 and 6, as indicated by the identical numerals used in both figures. The welding current is again supplied through a conductor 280 to a terminal stud 220 which feeds into sleeve 219 which, as in Fig. 6, is in current carrying connection with spring switch member 291 arranged for making contact with head 241 prior to the forcible contact of hammer 285 and spring head 241.

The insulating sleeve 235 is in the present instance provided with an auxiliary spring contact 435 which, with head 240 and work holder 450 in normal, retracted position, makes contact with the head of screw 436 insulated by sleeve 437 and screwed into terminal stud 438. A conductor 439 leads from terminal 438 to terminal 441 of the supply circuit.

Since the speed at which hammer 285 reaches head 241 may be essential for proper operation, an arrangement for regulating that speed is provided as follows. Tube 235 is provided with hole 445 which has at its outer end a somewhat widened threaded portion 446 leading with a conical valve seat into the narrower bore 445. Screwed into the threaded portion 446 is a slotted adjusting screw 448 which, in well known manner, permits regulation of the air flow from the compression chamber defined by sleeve 219, piston like member 231 and insulator tube 235. Adjustment of the discharge port of hole 445 by means of screw 448 regulates the flow of air from the above mentioned chamber and with it the advancing speed of hammer 285.

Fig. 14 also shows a provision for adjusting the relation of handle member 210—212 to the latch members 282 which, as described above, are released upon contact with edge 223 (Fig. 6) of sleeve 222 of the handle member 212. In Fig. 14, the length of member 222 is adjustable by means of unlatching sleeve 423 which is at 424 screwed into handle sleeve 222.

The circuit portion of the equipment according to Fig. 14 is shown as being supplied from a standard alternating current network a, c which feeds into transformers T1 and T2, supplying the anodes a1 a2 and the cathode k of tube V of the high vacuum, full wave rectifying type. This rectifier system feeds into direct current supply line d, c one of these wires, for instance d, being connected at g to the stationary work piece W, and grounded. The other direct current terminal c is connected, through a limiting resistor R1, to the terminal 400 of the welding tool.

One supply wire of the primary Tp of transformer T1 contains two switch contacts 451, 452 which are normally connected by the movable contact member 453 of a control switch S1 which is actuated by two solenoids M4 and M5. Solenoid M4 is shunted by a timing capacitor C4 and connected in series with a timing resistor R4 connected to a tap t of a voltage dividing resistor R5, which has the purpose of supplying a reduced voltage to solenoid M4. A discharge resistor R6 is connected between direct current supply wires d, c through two contacts 461 and 462 which are normally open but are connected by switch member 453 if solenoid M4 is energized. A normally de-energized solenoid M5 is connected to the main supply wires a, c through a normally open pushbutton control switch S2.

Under normal conditions, both solenoids M4 and M5 are de-energized. Contact 453 closes the connection of transformer Tp to the source and is retained in that position by locking stop b which, after M4 has been energized and with M5 de-energized, retains contact member 453 in the upper position establishing connection between contacts 461 and 462. If thereupon solenoid M5 is energized, locking member b is lifted and, if M4 is still de-energized, contact 453 is allowed to disconnect 461—462 and to reconnect 451—452.

The main welding condenser C is connected between direct current supply wires d, c.

The equipment according to Fig. 14 operates as follows:

Under normal operation, with stud w distanced from work piece W, solenoid M4 is de-energized, contacts 451—452 are connected, tube V is energized through transformer T1, and contacts 461—462 are disconnected.

The rectifier circuit including transformers T1, T2, and tube V charges the main capacitor C which discharges, upon operation of the tool as above described, through terminal 400, lead 280, terminal 220, sleeve 219, contacts 291—241, work holder 450, and the work pieces w, W, which are now forced together by the spring action described above with reference to Figs. 1 and 6.

If stud w should accidentally touch plate W, a circuit is established from resistor R5 representing a voltage source, through resistor R4—solenoid M4—terminal 441—conductor 439—contacts 436, 435—chuck 450—plate W—ground g—back to resistor R5. Energization of solenoid M4 attracts the armature of switch contact 453, opening the supply circuit of transformer primary Tp and thus de-energizing the rectifier tube V. Contacts 461, 462 are now closed and condenser C discharges through these contacts and resistor R6. In this manner discharge of the main capacitor through the welding tool is safely avoided and any damage prevented.

The circuit can be reset to normal condition, after M4 is de-energized through disconnection between w and W, with the armature portion 453 of switch S1 resting against the locking latch b, by energizing solenoid M5 through depressing switch S2 which energizes solenoid M5 lifts b and releases contact 453 which thereupon re-establishes connection between 451 and 452.

The de-energization of M4 can be adjusted by means of capacitor C4 and resistor R4 whose time constant determines the rate of discharge of C4 and hence the period during which M4 remains effective. The speed at which M4 becomes de-energized and cuts off the rectifier tube supply and causes discharge of capacitor C through resistor R before any harm is done to the internal circuit maker of the tool at 241—291, can thus be regulated. It will be apparent that adjustment of this period of time will depend upon the possibility of handle 212 being again depressed after the stud w has been detached from the plate W, and to a certain extent on the time elapsing between the release of latches 282 and actual contact at 241—291. This, as discussed above, can be regulated by means of the delay valve 448, or an arrangement of similar effect.

It should be understood that the present disclosure is for the purpose of illustration only and that this invention includes all modifications and equivalents which fall within the scope of the appended claims.

I claim:

1. Electric welding apparatus comprising direct current supply means, capacitor means adapted to be charged from said supply means, normally closed switch means which upon opening render said supply means ineffective, means for positioning two work pieces to be joined relatively to each other in place for welding but with one piece held at a distance from the other normally preventing direct contact therebetween, impact means for releasing said piece and for forcing said pieces into mechanical contact, conductor means for electrically connecting said pieces to respective terminals of said capacitor means, energy consuming means connected in parallel to said capacitor means for discharge through a normally open switch means, relay means for retaining said switch means in normal positions when de-energized but upon energization opening said first switch means and closing said second switch means and locking said switch means in these positions, means for energizing said relay means upon contact of said work pieces while said piece is held, normally open contact making means for preparing a welding circuit by closing said conductor means, means for actuating said impact means to force said mechanical contact, and means including a timer for closing said contact making means prior to said mechanical contact.

2. Electric welding apparatus comprising alternating current supply means, capacitor means adapted to be charged from said supply means, normally closed switch means which upon opening render said supply means ineffective, means for positioning two work pieces to be joined relatively to each other in place for welding but with one piece held at a distance from the other normally preventing direct contact therebetween, impact means for releasing said piece and for forcing said pieces into mechanical contact, conductor means for electrically connecting said pieces to respective terminals of said capacitor means, energy consuming means connected in parallel to said capacitor means for discharge through a normally open switch means, relay means for retaining said switch means in normal positions when de-energized but upon energization opening said first switch means and closing said second switch means and locking said switch means in these positions, relays means controllable from a point near said impact means for unlocking said relay means, means for energizing said relay means upon contact of said work pieces, while said piece is held, means for rendering said energizing means ineffective upon operation of said impact means, normally open contact making means controlled by said impact means and arranged in said conductor means for preparing a welding circuit by closing said conductor means, and a power supply for actuating said impact means to establish said mechanical contact and an actuator operated by said power supply and including a timer for closing said contact making means prior to the mechanical contact.

3. Electric welding apparatus comprising a guide casing; a plunger casing sliding on said guide casing, said plunger casing carrying a percussion block and a work holder, and slidingly engaging a working plunger adapted to impinge upon said block; means for supplying electric current to said block, said current supply means including a normally open switch and means for closing said switch shortly before said plunger impinges upon said block; a source of working force tending to move said plunger towards said block when said casings are moved against each other; latching means normally attaching said plunger to said plunger casing; and means associated with said guide casing for releasing said latching means upon said relative movement of said casings.

4. Electric welding apparatus comprising a guide casing; a plunger casing sliding on said guide casing, said plunger casing carrying a percussion block and a work holder, and slidingly engaging a working plunger adapted to impinge upon and to make electrical contact with said block; means for supplying electric current to said plunger; a source of working force tending to move said plunger towards said block when said casings are moved against each other; latching means normally attaching said plunger to said plunger casing; and means associated with said guide casing for releasing said latching means upon said relative movement of said casings.

5. Electric welding apparatus comprising a guide casing; a plunger casing sliding on said guide casing, said plunger casing carrying a percussion block and a piercing tool holder, and slidingly engaging a working plunger adapted to impinge upon and to make electrical contact with said block; piercing means secured in said holder and including a working portion of non-welding material; means for supplying electric current to said plunger; a source of working force tending to move said plunger towards said block when said casings are moved against each other; latching means normally attaching said plunger to said plunger casing; and means associated with said guide casing for releasing said latching means upon said relative movement of said casings.

6. Electric welding apparatus comprising a guide casing; a plunger casing sliding on said guide casing, said plunger casing carrying slidingly fastened thereto a percussion block and holding means fastened thereto; a working plunger slidingly mounted on said plunger casing and adapted to impinge upon and to make electrical contact with said block; spring means tending to move said block towards said plunger, means for distancing said casings from a work piece; means for supplying electric current to said plunger; a source of working force tending to move said plunger towards said block when said casings are moved against each other; latching means normally attaching said plunger to said plunger casing; and means associated with said guide casing for releasing said latching means upon said relative movement of said casings.

7. Electric welding apparatus comprising a guide casing; a plunger casing sliding on said guide casing, said plunger casing carrying slidingly fastened thereto a percussion block and holding means fastened thereto; spring means tending to move said block and said holding means towards said guide casing; a working plunger slidingly mounted on said plunger casing and adapted to impinge upon and to make electrical contact with said block; spring means tending to move said block towards said plunger, means for distancing said casings from a work piece; means for supplying electric current to said plunger, normally substantially relaxed spring means tending to move said plunger towards said block when said casings are moved against each other; latching means normally engaging said plunger to said plunger casing; means associated with said guide casing for releasing said latching means upon said relative movement of said casings, and normally substantially relaxed spring means tending to move said plunger within said plunger casing for re-engagement by said latch means.

8. Electric welding apparatus comprising a guide casing; a plunger casing sliding on said guide casing, said plunger casing carrying insulated therefrom and slidingly fastened thereto a percussion block; a work holder carried by said percussion block; a working plunger insulated from said guide casing, slidingly mounted on said plunger casing, and adapted to impinge upon said block; yielding switching means for making electrical contact between said plunger and said block before said plunger impinges on said block; spring means tending to move said block towards said plunger; means fastened to said plunger casing for distancing it from a work piece; means for supplying electric current to said plunger; spring means tending to move said plunger towards said block when said casings are moved against each other; latching means normally engaging said plunger to said plunger casing; and means associated with said guide casing for releasing said latching means upon said relative movement of said casings.

9. Electric welding apparatus comprising a guide casing; a plunger casing of insulating material sliding on said guide casing, said plunger casing carrying insulated therefrom and slidingly fastened thereto a percussion block having a conical portion and fastened thereto a work holder; a working plunger slidingly mounted on said plunger casing and adapted to impinge upon said block; longitudinally arranged spring means arranged for making electrical contact with said conical portion before said plunger impinges on said block; spring means tending to move said block and said work holder towards said plunger; means fastened to said plunger casing for distancing it from a work piece; means for supplying electric current to said guide casing and from there to said plunger; spring means tending to move said plunger towards said block when said casings are moved against each other; latching means normally engaging said plunger to said plunger casing; and means associated with said guide casing for releasing said latching means upon said relative movement of said casings.

10. Electric welding apparatus comprising a guide casing; a plunger casing sliding on said guide casing, said plunger casing carrying insulated therefrom and slidingly fastened thereto a percussion block and fastened thereto a work holder; a conductive sleeve mounted within and insulated from said plunger casing; a working plunger slidingly mounted within said sleeve and adapted to impinge upon said block; means for making electrical contact between said plunger and said block before said plunger impinges upon said block; spring means tending to move said block towards said plunger; means fastened to said plunger casing for distancing it from a work piece; means for supplying electric current to said sleeve and hence to said plunger; spring means tending to move said plunger towards said block when said casings are moved against each other; latching means normally engaging said plunger to said plunger casing; and means associated with said guide casing for releasing said latching means upon said relative movement of said casings.

11. Electric welding apparatus comprising a guide casing; a plunger casing sliding on said guide casing; insulating means lining said plunger casing; a metallic percussion block slidingly arranged within said insulating means; a work holder fastened to said percussion block; a conductive sleeve mounted within said insulating means; a metallic working plunger slidingly mounted within said conductive sleeve and adapted to impinge upon said block; means for electrically contacting said plunger with said block; means for supplying electric current to said conductive sleeve and hence to said plunger; means tending to move said plunger towards said block when said casings are moved against each other; means normally engaging said plunger to said plunger casing; and means associated with said guide casing for releasing said engaging means upon said relative movement of said casings.

12. Electric welding apparatus comprising a metallic guide casing; a metallic plunger casing sliding on said guide casing; insulating means lining said plunger casing; a metallic percussion block slidingly arranged within said insulating means; a work holder fastened to said percussion block; a conductive sleeve mounted within said insulating means; a metallic working plunger slidingly mounted within said conductive sleeve and adapted to impinge upon said block; longitudinally arranged spring means arranged for making electrical contact with said plunger and said block before said plunger impinges upon said block; spring means tending to move said block towards said plunger; means fastened to said plunger casing for distancing it from a work piece; means for supplying electric current to said metallic sleeve and hence to said plunger; spring means tending to move said plunger towards said block when said casings are moved against each other; latching means normally engaging said plunger to said plunger casing; and means associated with said guide casing for releasing said latching means upon said relative movement of said casings.

13. Electric welding apparatus comprising a guide casing; a plunger casing sliding on said guide casing; insulating means lining said plunger casing; a conductive sleeve mounted within said insulating means; a metallic percussion block slidingly arranged within said conductive sleeve; a work holder fastened to said percussion block; a working plunger slidingly mounted within said insulating means and adapted to impinge upon said block; means for electrically connecting said conductive sleeve and said percussion block to said plunger and said block; terminal means mounted on said plunger casing for supplying electric current to said conductive sleeve and hence to said block; means tending to move said plunger towards said block when said casings are moved against each other; means normally engaging said plunger to said plunger casing; and means associated with said guide casing for releasing said engaging means upon said relative movement of said casings.

14. Electric welding apparatus comprising a guide casing; a plunger casing sliding on said guide casing; insulating means lining said plunger casing; a metallic percussion block slidingly arranged within said insulating means; means for normally retaining said percussion block in withdrawn position; a work holder fastened to said percussion block; a conductive sleeve mounted within said insulating means; a metallic working plunger slidingly mounted within said conductive sleeve and adapted to impinge upon said block to move it forward from said withdrawn position; means for electrically contacting said plunger with said block; main terminal means mounted on one of said casings for supplying electric current to said conductive sleeve and hence to said plunger; means tending to move said plunger towards said block when said casings are moved against each other; means normally engaging said plunger to said plunger casing; auxiliary terminal means mounted on said plunger casing; and means for making electrical contact between said work holder and said auxiliary terminal means when said work holder is in said withdrawn position; and means associated with said guide casing for releasing said engaging means upon said relative movement of said casings to cause impingement of said plunger upon said block and forward movement of said block and said work holder.

15. Electric welding apparatus comprising a metallic guide casing; a metallic plunger casing sliding on said guide casing; insulating means lining said plunger casing; a metallic percussion block slidingly arranged within said insulating means; a work holder fastened to said percussion block; a conductive sleeve mounted within said insulating means; a metallic working plunger slidingly mounted within said conductive sleeve and adapted to impinge upon said block; means for electrically contacting said plunger with said block before said plunger impinges upon said block; timing means for adjustably retarding the relative movement of said plunger and said block; spring means tending to move said block towards said plunger; means fastened to said plunger casing for distancing it from a work piece; means tending to move said plunger towards said block when said casings are moved against each other; means normally engaging said plunger to said plunger casing; and means associated with said guide casing for releasing said engaging means upon a predetermined relative movement of said casings.

16. Electric welding apparatus comprising a metallic guide casing; a metallic plunger casing sliding on said guide casing; insulating means lining said plunger casing; a metallic percussion block slidingly arranged within said insulating means; a work holder fastened to said percussion block; a conductive sleeve mounted within said insulating means; a metallic working plunger slidingly mounted within said conductive sleeve and adapted to impinge upon said block; means for electrically contacting said plunger with said block before said plunger impinges upon said block; spring means tending to move said block towards said plunger; means fastened to said plunger casing for distancing it from a work piece; means tending to move said plunger towards said block when said casings are moved against each other; means normally engaging said plunger to said plunger casing; actuating means associated with said guide casing for releasing said engaging means upon relative movement of said casings; and means for adjusting said actuating means to release said engaging means when said casings have reached a predetermined relative position.

17. Electric welding apparatus comprising electric energy supply means, a gun having a chuck for holding one of two work pieces relatively to the other and impact means for forcing said pieces together by applying a blow to said chuck, conductor means for electrically connecting said pieces to respective terminals of said supply means, two normally separated contacts arranged in series connection in said conductor means for preparing, when closed, a welding circuit, one contact being carried by said impact means and the other by said chuck, and means for releasing said impact means to close said contact prior to the application of said blow by said impact means.

HAROLD J. GRAHAM.

REFERENCES CITED

The following references are of record in the file of this patent:

UNITED STATES PATENTS

| Number | Name | Date |
|---|---|---|
| Re. 17,949 | Chubb | Feb. 3, 1941 |
| 1,066,468 | Chubb | July 8, 1913 |
| 1,269,726 | Mershon | June 18, 1918 |
| 1,332,155 | Apple | Feb. 24, 1920 |
| 1,684,108 | Phelps | Sept. 11, 1928 |
| 1,833,660 | Siebs et al. | Nov. 24, 1931 |
| 2,005,752 | Pfaustiehl | June 25, 1935 |
| 2,054,245 | Cummins | Sept. 15, 1936 |
| 2,085,100 | Knowles et al. | June 29, 1937 |
| 2,213,630 | Gade | Sept. 3, 1940 |
| 2,384,403 | Somers | Sept. 4, 1945 |
| 2,402,659 | Nelson | June 25, 1946 |
| 2,419,749 | Weinhardt et al. | Apr. 29, 1947 |

FOREIGN PATENTS

| Number | Country | Date |
|---|---|---|
| 520,411 | Great Britain | Apr. 23, 1940 |